US011519236B1

(12) United States Patent
Baugh

(10) Patent No.: US 11,519,236 B1
(45) Date of Patent: Dec. 6, 2022

(54) METHOD FOR SEAL RING RETENTION

(71) Applicant: Benton Frederick Baugh, Houston, TX (US)

(72) Inventor: Benton Frederick Baugh, Houston, TX (US)

(*) Notice: Subject to any disclaimer, the term of this patent is extended or adjusted under 35 U.S.C. 154(b) by 0 days.

(21) Appl. No.: 17/386,277

(22) Filed: Jul. 27, 2021

(51) Int. Cl.
E21B 33/038 (2006.01)
F16L 37/62 (2006.01)
F16L 37/084 (2006.01)

(52) U.S. Cl.
CPC ........ E21B 33/038 (2013.01); F16L 37/0842 (2013.01); F16L 37/62 (2013.01)

(58) Field of Classification Search
CPC ..... E21B 33/038; F16L 37/0842; F16L 37/62; F16L 37/0845; F16L 23/16; F16L 23/04
USPC .................................. 285/920, 364
See application file for complete search history.

(56) References Cited

U.S. PATENT DOCUMENTS

| 3,231,297 | A | * | 1/1966 | Watts | E21B 33/038 285/411 |
| 3,321,217 | A | * | 5/1967 | Ahlstone | E21B 33/038 285/379 |
| 3,628,812 | A | * | 12/1971 | Larralde | F16L 37/133 285/364 |
| 4,153,278 | A | * | 5/1979 | Ahlstone | F16L 37/62 285/263 |
| 4,153,281 | A | * | 5/1979 | Ahlstone | F16L 27/06 285/380 |
| 4,401,164 | A | | 8/1983 | Baugh | |
| 4,496,172 | A | | 1/1985 | Walker | |
| 4,516,795 | A | | 5/1985 | Baugh | |
| 5,570,911 | A | * | 11/1996 | Galle | F16L 23/04 285/379 |
| 6,070,669 | A | | 6/2000 | Radi | |
| 6,609,734 | B1 | | 8/2003 | Baugh | |
| 2005/0200128 | A1 | * | 9/2005 | Bongiorno | F16L 23/04 285/364 |

OTHER PUBLICATIONS

I filed a provisional application Jun. 29, 2020 as EFS ID 40134555 and U.S. Appl. No. 63/057,965 and intended to link this application to it, but could not figure out how to do it.

* cited by examiner

Primary Examiner — David Bochna

(57) ABSTRACT

In a hydraulic connector for connecting a portion of the hydraulic connector to a mandrel and having a seal ring with an external groove to seal between the hydraulic connector and the mandrel the method of providing a locking segments having an inner position and a radially outward second position, providing when the latches are in a first latch position a portion is engaged with the locking segments in the radially inward position and a second latch portion is disengaged from the external groove of the seal ring to release the seal ring, and providing when the one or more latches are in a second latch position the first latch portion is engaged with one or more of the locking segments in the radially outward position the second latch portion is engaged with the external groove of the seal ring to retain the seal ring.

3 Claims, 5 Drawing Sheets

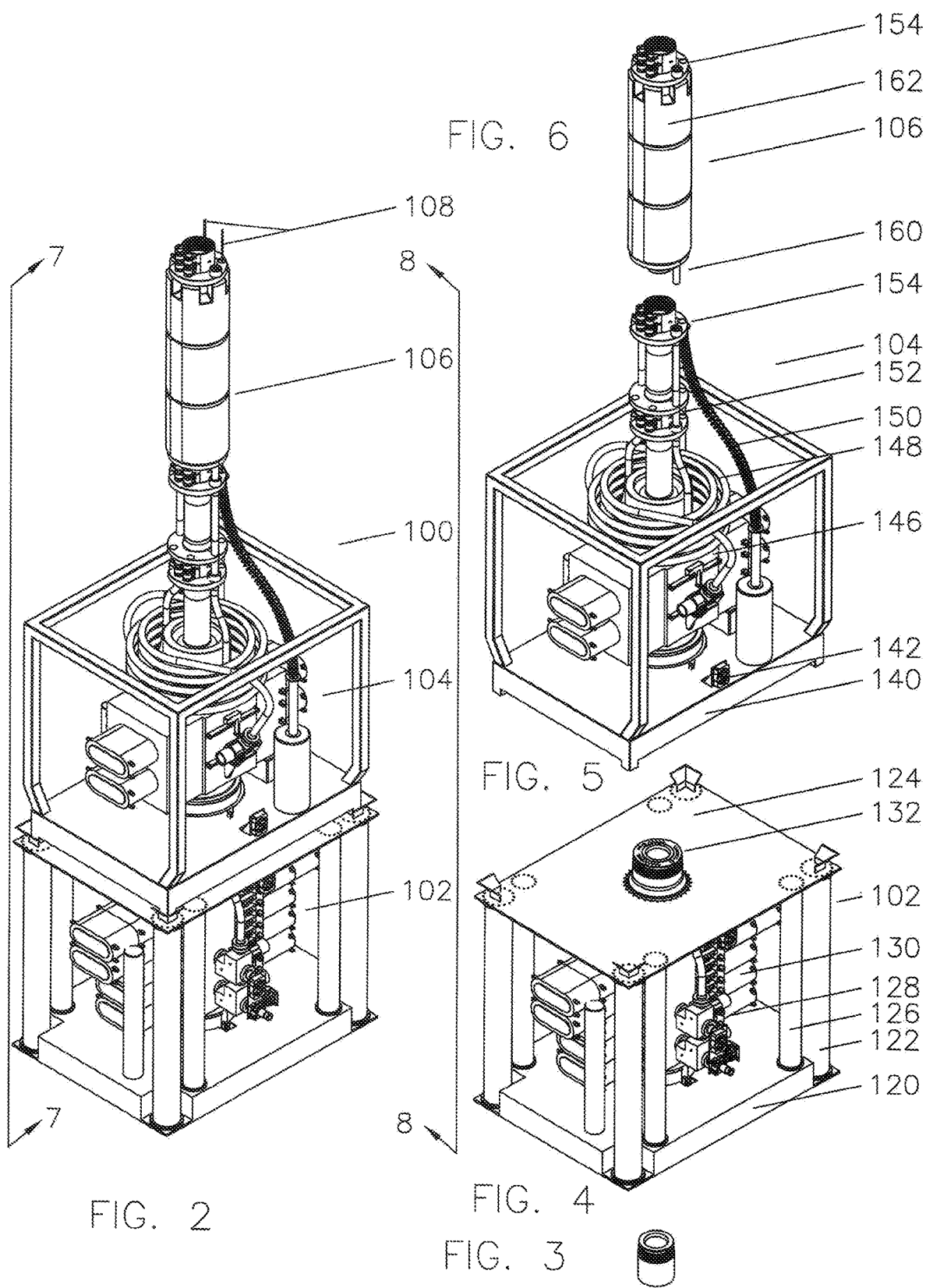

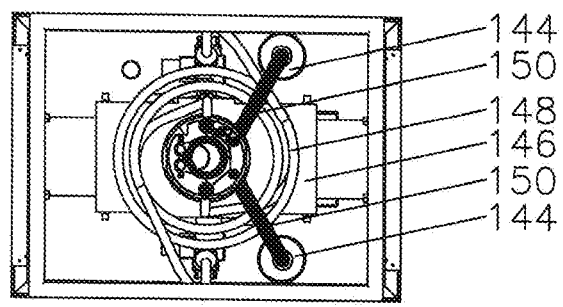

METHOD FOR SEAL RING RETENTION

TECHNICAL FIELD

This invention relates to the method of providing for seal retention in a subsea blowout preventer stack hydraulic connector, typically at the bottom of the lower blowout preventer stack and the bottom of the lower marine riser package.

CROSS-REFERENCE TO RELATED APPLICATIONS

Not applicable.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

Deepwater offshore drilling requires that a vessel at the surface be connected through a drilling riser and a large blowout preventer stack to the seafloor wellhead. The seafloor wellhead is the structural anchor piece into the seabed and the basic support for the casing strings which are placed in the well bore as long tubular pressure vessels. During the process of drilling the well, the blowout preventer stack on the top of the subsea wellhead provides the second level of pressure control for the well. The first level being provided by the weighted drilling mud within the bore.

During the drilling process, weighted drilling mud circulates down a string of drill pipe to the drilling bit at the bottom of the hole and back up the annular area between the outside diameter of the drill pipe and the inside diameter of the drilled hole or the casing, depending on the depth.

Coming back up above the blowout preventer stack, the drilling mud will continue to travel back outside the drill pipe and inside the drilling riser, which is much large than the casing. The drilling riser has to be large enough to pass the casing strings run into the well, as well as the casing hangers which will suspend the casing strings. The bore in a contemporary riser will be at least twenty inches in diameter. It additionally has to be pressure competent to handle the pressure of the weighed mud, but does not have the same pressure requirement as the blowout preventer stack itself.

As wells are drilled into progressively deeper and deeper formations, the subsurface pressure and therefore the pressure which the blowout preventer stack must be able to withstand becomes greater and greater. This is the same for drilling on the surface of the land and subsea drilling on the surface of the seafloor. Early subsea blowout preventer stacks were of a 5,000 p.s.i. working pressure, and over time these evolved to 10,000 and 15,000 p.s.i. working pressure. As the working pressure of components becomes higher, the pressure holding components naturally become both heavier and taller. Additionally, in the higher pressure situations, redundant components have been added, again adding to the height. The 15,000 blowout preventer stacks have become in the range of 800,000 lbs. and 80 feet tall. This provides enormous complications on the ability to handle the equipment as well as the loadings on the seafloor wellhead. In addition to the direct weight load on the subsea wellheads, side angle loadings from the drilling riser when the surface vessel drifts off the well centerline are an enormous addition to the stresses on both the subsea wellhead and the seafloor formations.

When the blowout preventer stack working pressure is increased to 20,000 p.s.i. some estimates of the load is that it increases from 800,000 to 1,200,000 lbs. The height also increases, but how much is unclear at this time but it will likely approach 100 feet in height.

A second complication is that a 20,000 p.s.i. working pressure requires a 30,000 p.s.i. test pressure. As the actual stresses in material is greater than the bore pressure, the differential between the actual stress level and the yield strength of the material becomes much narrower. Imagine for a 15,000 p.s.i. component the maximum stress is 32,000 p.s.i. at working pressure and 48,000 p.s.i. at the 22,500 p.s.i. required test pressure. If the best reasonably available material has a 75,000 p.s.i. yield strength at that point you are working with a 1.56/1 factor. If you simply increase the working pressure to 20,000 p.s.i. with a 30,000 p.s.i. test pressure, the stress at test pressure goes to 72,000 p.s.i. which has barely a 1.04/1 safety factor. With the complications of stress analysis, even doubling the weight of the components will not get the stress levels back down to a reasonable level.

The seal ring at the interface between the lower blowout preventer stack connector and the subsea wellhead housing and at the interface between the lower marine riser connector and the upper mandrel on the lower blowout preventer stack must be installed and retained in position during deployment of these components. If the seal ring does not seal properly when landed subsea, there is a need to remotely release the seal ring to land on the mandrel or wellhead below and lift the blowout preventer stack system a few feet. At that time a subsea remotely operated vehicle (ROV) can remove the defective seal ring and replace it with a new seal ring and the blowout preventer stack system can be relanded.

Remote retention methods in these remotely actuated hydraulic connectors have typically been using small hydraulic pistons with hydraulic porting through the wall of the highly stresses connector wall, trying to add mechanical linkages through the same wall.

FIGS. 6 and 7 of U.S. Pat. No. 6,070,669 show the retention means of one of these seal rings although neither the seal ring or the retention means are neither numbered or identified. On FIG. 6 the seal ring is midway between the number 129 and the number 127 and is shown with a groove in its outer surface. A small white box (not cross hatched) on the outside of the seal ring is shown engaging the groove in the outer surface of the seal ring. Below the small white box is what appears to be the head of a bolt which would be retaining the small white box in place. If it is a bolt, it means that someone has to go below a subsea blowout preventer stack weighing up to one million lbs. to release the bolt to replace the seal ring, and there is no way to remove it remotely. If it is some kind of an actuating rod which will rotate the small white box to release the seal ring, it must go upwardly through the connector to some place some kind of hydraulic mechanism can rotate it. It then requires that a remote hydraulic function be provided in each of the control pods to actuate it.

That this is a difficult problem to solve is illustrated by the fact that these figures nor any of the remainder of the figures in the patent or other patents found show any to ways in which this has been accomplished.

After the past 60 years of utilizing hydraulic connectors of this type, a simple solution has not been found.

BRIEF SUMMARY OF THE INVENTION

The object of this invention is to reduce the size, weight, and complexity of subsea blowout preventer stacks.

A second object of this invention is to allow the remote replacement of the seal rings of the hydraulic connectors at the bottom of the lower blowout preventer stack and the bottom of the lower marine riser package.

A third object of this invention is to allow the remote replacement of the seal rings of the hydraulic connectors at the bottom of the lower blowout preventer stack and the bottom of the lower marine riser package without requiring separate hydraulic functions to actual it.

BRIEF DESCRIPTION OF THE DRAWINGS

FIG. 2 is a perspective view of a blowout preventer stack utilizing the features of this invention.

FIG. 3 is a perspective view of a subsea wellhead housing which the blowout preventer stack of this invention would land on.

FIG. 4 is a perspective view of the lower portion of the blowout preventer stack of FIG. 2, generally called the lower BOP stack.

FIG. 5 is a perspective view of the upper portion of the blowout preventer stack of FIG. 2, generally called the lower marine riser package or LMRP.

FIG. 6 is a perspective view of a section of the drilling riser which will be used to lower the blowout preventer stack.

FIG. 7 is a view of the blowout preventer stack of FIG. 2, taken along lines "7-7.

FIG. 8 is a view of the blowout preventer stack of FIG. 2, taken along lines "8-8.

FIG. 9 is a top view of FIG. 8.

DETAILED DESCRIPTION OF THE INVENTION

Figure 1:
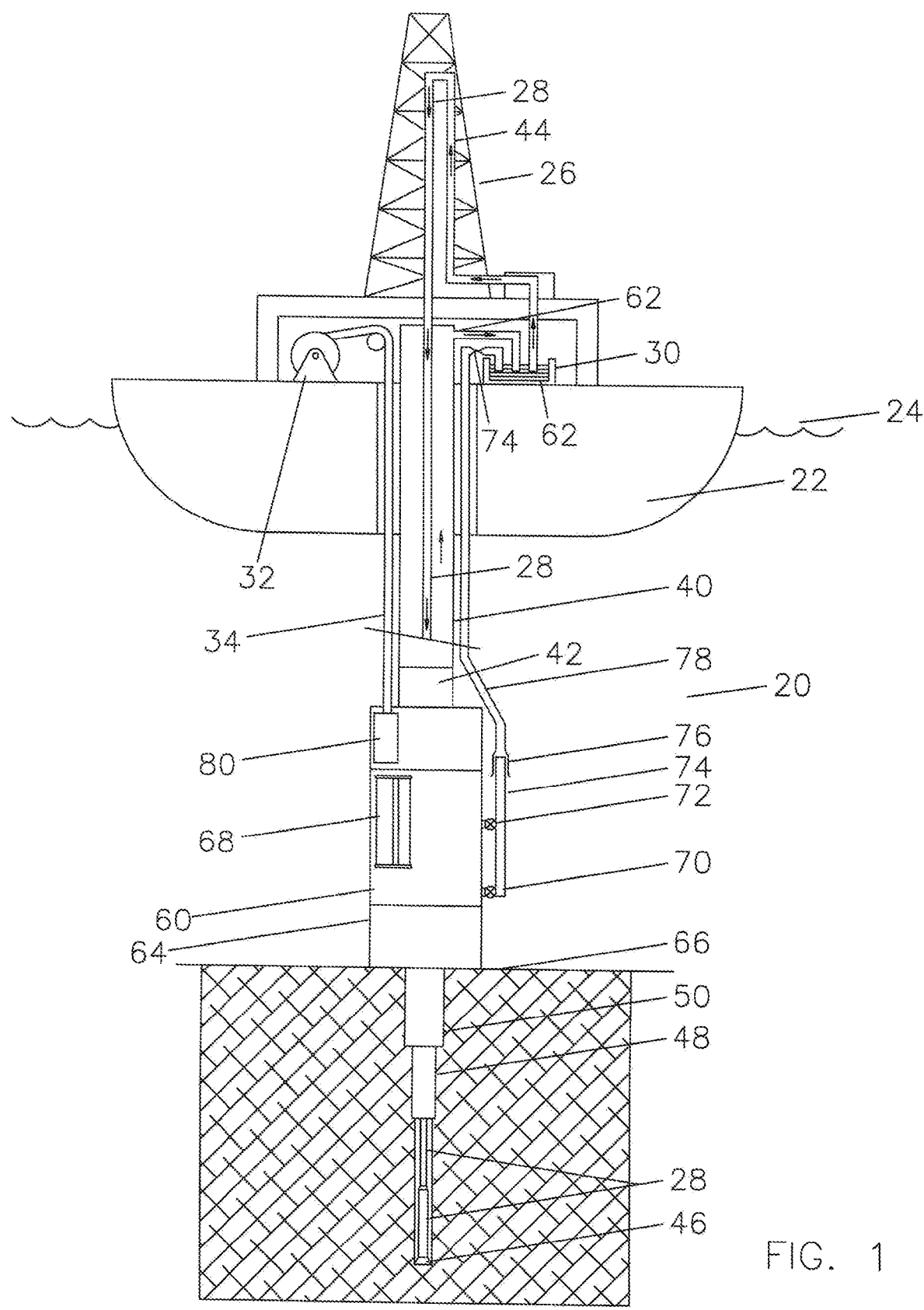
FIG. 1 is a view of a contemporary deep-water riser system.

Referring now to FIG. 1, a view of a system 20 which might use the present invention is shown. It shows a floating vessel 22 on a body of water 24 and having a derrick 26. Drill pipe 28, drilling mud system 30, control reel 32, and control cable 34 are shown. A riser system 40 including a flex joint 42 is shown. During drilling the drilling mud circulated from the drilling mud system 30, up the standpipe 44, down the drill pipe 28, through the drill bit 46, back up through the casing strings 48 and 50, through the blowout preventer stack 60, up thru the riser system 40, and out the bell nipple at 62 back into the mud system 30.

Blowout preventer stack 60 is landed on a subsea wellhead system 64 landed on the seafloor 66. The blowout preventer stack 60 includes pressurized accumulators 68, kill valves 70, choke valves 72, choke and kill lines 74, choke and kill connectors 76, choke and kill flex means 78, and control pods 80.

Referring now to FIG. 2, the seafloor drilling system 100 comprises a lower blowout preventer stack 102, a lower marine riser package 104, a drilling riser joint 106, and control cables 108.

Referring now to FIG. 3, a subsea wellhead is shown which the seafloor drilling system lands on. It is the unseen upper portion of the subsea wellhead system 64 shown in FIG. 1.

Referring now to FIG. 4, the lower blowout preventer stack 102 comprises a lower structural section 120, vertical support bottle 122, and upper structural section 124, accumulators 126, choke and kill valves 128, blowout preventers 130 and an upper mandrel 132 which will be the connection point for the lower marine riser package.

Referring now to FIG. 5 the lower marine riser package 104 is shown comprising a lower marine riser package structure 140, an interface 142 for a remotely controlled vehicle (ROV), annular blowout preventers 146, choke and kill flex loops 148, a flexible passageway 150, a riser connector 152, and an upper half of a riser connector 154.

Referring now to FIG. 6, a drilling riser joint 106 is shown having a lower half of a riser connector 160, a upper half of a riser connector 154, and buoyancy sections 162.

Referring now to FIG. 7, is a view of seafloor drilling system 100 taken along lines "7-7" of FIG. 1 showing wellhead connector 170, lower marine riser connector 172, a man 174 for size perspective, and choke and kill valves 176.

Referring now to FIG. 8, is a view of seafloor drilling system 100 taken along lines "8-8" of FIG. 1.

Referring now to FIG. 9, is a top view of seafloor drilling system 100.

Figure 10:
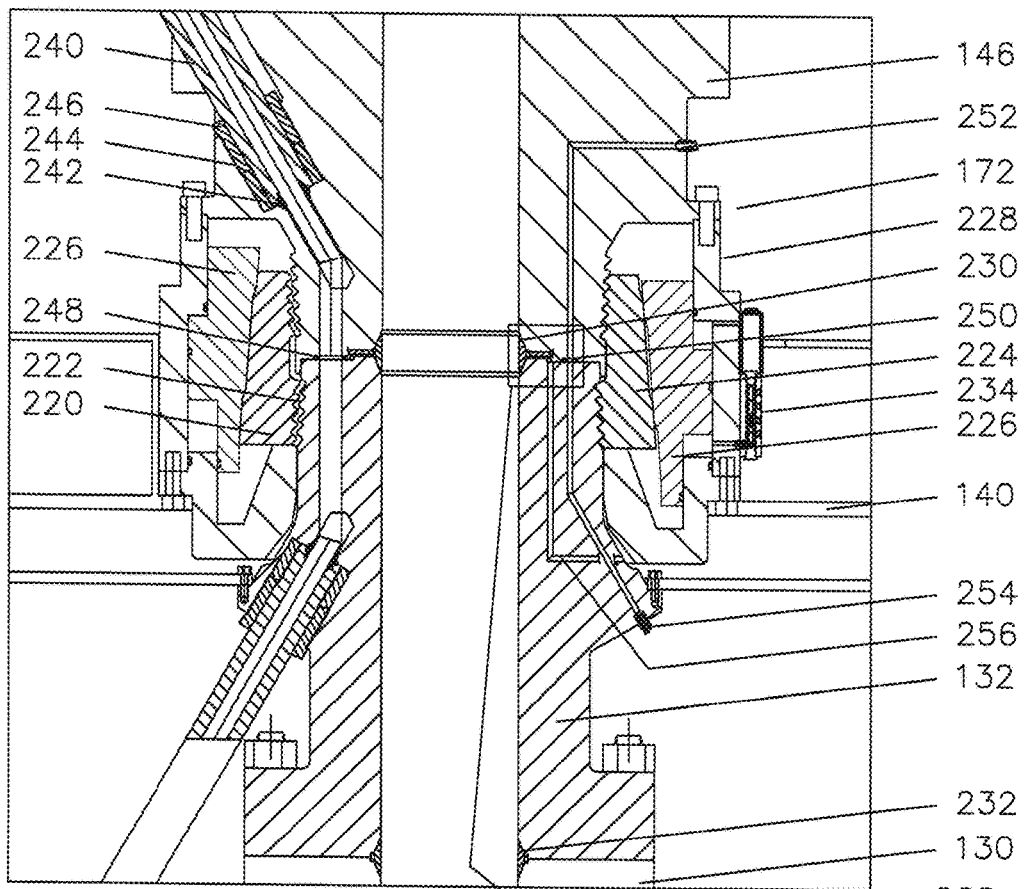
FIG. 10 is a view taken from the box "10-10" of FIG. 7 showing a cross section of the lower marine riser connector and the mandrel at the top of the lower blowout preventer stack.

Referring now to FIG. 10 which is a figure generally taken from the box "10-10" from FIG. 7 showing the lower marine riser connector 172 connected to the upper mandrel 132 of the lower blowout preventer stack 102. A multiplicity of dogs 220 are shown disconnected from the upper mandrel profile 222 on the left side of the figure and are shown at 224 connected to the upper mandrel profile on the right side of the figure. This is effected by having ring shaped piston 226 in and upwardly position on the left side of the figure and in a more downwardly position on the right side of the figure. As the ring shaped piston moves downwardly, the multiplicity of dogs 220 are constricted about the upper mandrel 132.

Seal ring 230 sealingly engages the lower end of the annular blowout preventer connector portion 146 and the upper end of the upper mandrel 132 on the lower blowout preventer stack. A similar seal ring 232 seals the upper end of the lower blowout preventer stack 130 and the lower end of the upper mandrel 132. A four input shuttle valve receives input from the blue control pod, the yellow control pod, the acoustic control pod, and a remotely operated vehicle interface similar to 142 to give complete redundant control of the connector.

Similarly a multiplicity of seal rings 250 can be added for the porting of control lines through the same section from an inlet port 252 down to and outlet port 254. By utilizing this space, the need for separate stab plates for control pods is eliminated. One or more vent lines 256 can be added to vent any pressure buildups around these seals and keep them individually isolated.

Figure 11:
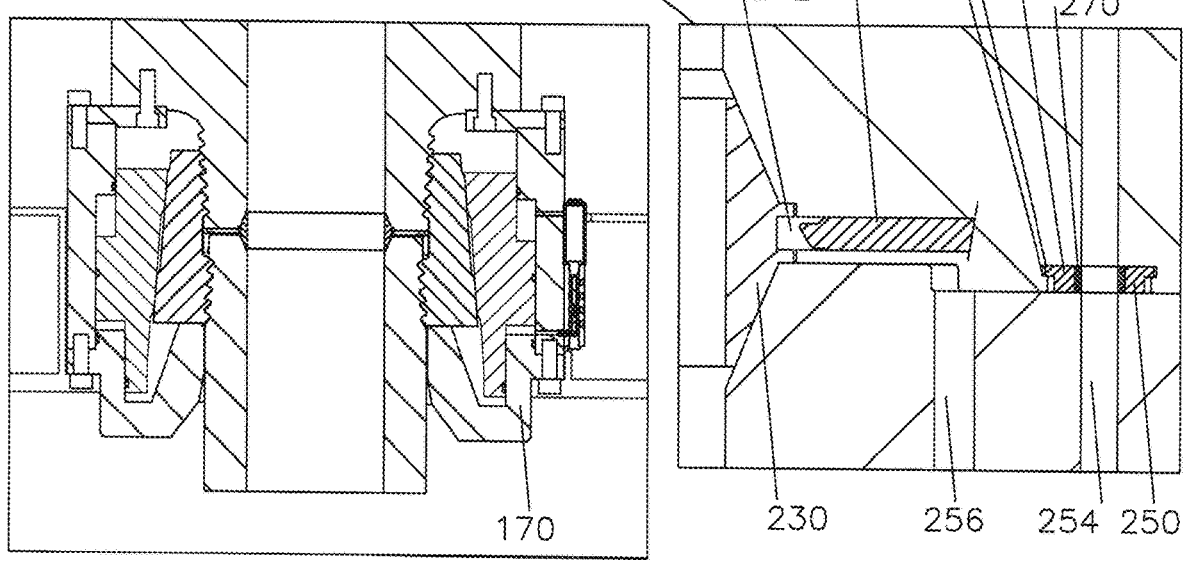
FIG. 11 is a view taken from the box "11-11" of FIG. 7 showing a cross section of the lower blowout preventer stack connector and the wellhead housing.

Referring now to FIG. 11 a similar cross section of the lower wellhead connector 170 taken from "11-11" of FIG. 7 of the same working pressure and same scale as the connector shown in FIG. 10 to show the change in wall thickness.

Figure 12:
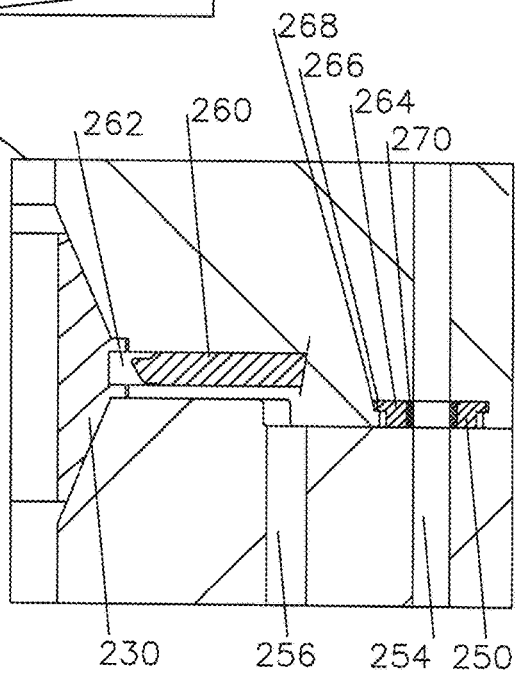
FIG. 12 is a partial view of FIG. 10 showing the seal ring in the released position.

Referring now to FIG. 12 which is a portion of FIG. 10 showing the expanded position of latch plate 260 for retaining seal ring 230. It will be moved into groove 262 as will be described following. Seal rings 250 comprise a resilient seal material 264 having a protruding section 266 going into annular groove 268 for seal retention and an internal metal ring 270 for resisting external pressure.

Figure 13:
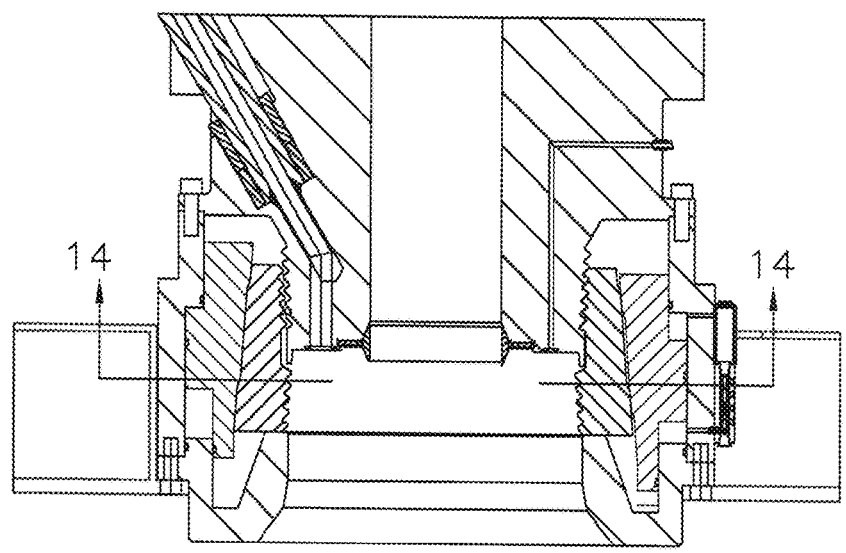
FIG. 13 is similar to FIG. 10 with the lower blowout preventer stack portions removed, and is taken along lines "13-13" of FIG. 14.
Figures 14, 15:
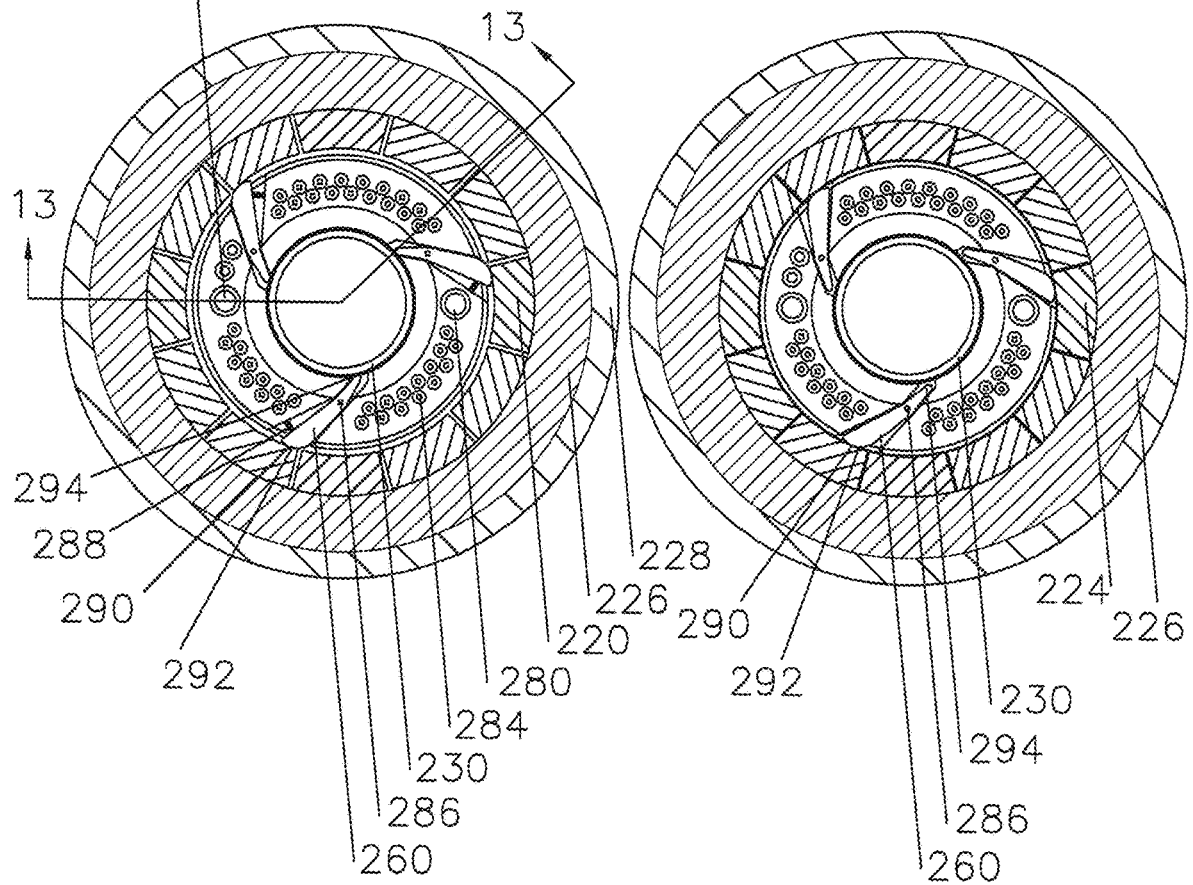
FIG. 14 is a cross section of the lower marine riser connector of FIG. 13 taken along lines "14-14" showing the connector unlocked and latch plates engaging the seal ring to retain it.
FIG. 15 is a cross section of FIG. 13 taken along lines "14-14" showing the lower marine riser connected and the latch plates released from the seal ring.

Referring now to FIG. 13 which is similar to FIG. 10 with the lower blowout preventer stack portions removed, and is taken along lines "13-13" of FIG. 14.

Referring now to FIG. 14 taken along lines "14-14" of FIG. 13, choke line 280, kill line 282, and a multiplicity of hydraulic ports 284 are shown. Each of these ports are shown as hydraulic, but in some cases electrical connection, fiber optic, or mechanical connections may also be used. A latch plate 260 is shown pivotably mounted about a mechanical connection 286 with spring 288 pushing the end 290 against inner surface 292 of the dogs 220 in the unlocked or expanded position causing the other end 294 to engage the groove 262 (see FIG. 19) of the seal ring 230. This means that whenever the connector is moved to the unlocked position, it automatically latches into the seal ring.

Referring now to FIG. 15 taken along lines "14-14" of FIG. 13, the ring shaped piston 226 has been moved down as is illustrated in the right hand portion of FIG. 17 causing the multiplicity of dogs 224 to be move inwardly thereby causing their inner surface 292 to move inwardly rotating the latch plate 260 to rotate about mechanical connection 286. This means that when the connector is locked it automatically releases the seal ring rather than requiring extra mechanisms, hydraulic porting, and control signals to release the seal ring. To remove a seal ring, it requires that the connector be moved to the locked position when it is not landed on a wellhead or mandrel.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

SEQUENCE LISTING

N/A

That which is claimed is:

1. A method for connecting a portion of the hydraulic connector to a mandrel, clamp or housing and having a seal ring with an external groove or shoulder to seal between the hydraulic connector and the mandrel, clamp, or housing, the method comprising providing a multiplicity of locking segments having a first inner position when one or more segment locking shoulders on the locking segments engage one or more locking shoulders on the mandrel, clamp, or housing and a radially outward second position when the one or more segment locking shoulders on the locking segments are disengaged from the one or more locking shoulders on the mandrel, clamp or housing, providing one or more latches in a first latch position when a first latch portion is engaged with one or more of the multiplicity of locking segments in the first inner position and a second latch portion is disengaged from the external groove or shoulder of the seal ring to release the seal ring, and providing when the one or more latches are in a second latch position the first latch portion is engaged with one or more of the multiplicity of locking segments in the radially outward second position and the second latch portion is engaged with the external groove or shoulder of the seal ring to retain the seal ring.

2. The method of claim 1, further comprising the one or more latches are pivotably mounted on the hydraulic connector.

3. The method of claim 1, further comprising the one or more latches are spring loaded to be engaged with the multiplicity of locking segments.

* * * * *